(12) United States Patent
Nancekievill

(10) Patent No.: US 7,835,584 B1
(45) Date of Patent: Nov. 16, 2010

(54) METHOD AND APPARATUS FOR PROCESSING VIDEO DATA

(75) Inventor: Dominic James Nancekievill, West Wycombe (GB)

(73) Assignee: Altera Corporation, San Jose, CA (US)

(*) Notice: Subject to any disclaimer, the term of this patent is extended or adjusted under 35 U.S.C. 154(b) by 1045 days.

(21) Appl. No.: 11/593,993

(22) Filed: Nov. 6, 2006

(51) Int. Cl.
*G06K 9/40* (2006.01)
*G06K 9/54* (2006.01)

(52) U.S. Cl. ........................ 382/260; 382/307

(58) Field of Classification Search ............... 382/307, 382/276, 277, 254, 260; 348/607, 608; 358/3.27, 358/1.17
See application file for complete search history.

(56) References Cited

U.S. PATENT DOCUMENTS

| | | | |
|---|---|---|---|
| 5,469,223 A | | 11/1995 | Kimura |
| 5,671,020 A | * | 9/1997 | Law .......................... 348/608 |
| 7,020,201 B2 | * | 3/2006 | Luo et al. ............... 375/240.16 |
| 2006/0061827 A1 | * | 3/2006 | Moss et al. ................ 358/3.27 |

OTHER PUBLICATIONS

Krueger, "Virtex-EM FIR Filter for Video Applications", www.xilinx.com, Oct. 3, 2000, pp. 1-6, vol. 1.1, XAPP241.

* cited by examiner

*Primary Examiner*—Yon Couso
(74) *Attorney, Agent, or Firm*—Ropes & Gray LLP

(57) ABSTRACT

A video processing device processes pixels in columns. That is, the pixel array is divided into columns, and the video processing device first processes one row of pixels within a first column, then moves on to the next row within that column, and so on until that column is completely processed, and then moves on to the next column, to process the rows of pixels in that column, and so on. When performing a video processing function that calculates an output pixel value as a function of an input pixel value for the pixel of interest, and of input pixel values for one or more adjacent or surrounding pixels, this reduces the requirement for buffer storage of the input pixel values within the processing device, and allows them to be retrieved from an external memory device in an efficient manner.

10 Claims, 7 Drawing Sheets

METHOD AND APPARATUS FOR PROCESSING VIDEO DATA

BACKGROUND OF THE INVENTION

This invention relates to a method and an apparatus for processing data, for example image data or video data.

It is common practice to store image data and video data in digital form. That is, each frame of a motion picture, television program, etc is divided into pixels, which are arranged in rows and columns. Similarly, an image is divided into pixels. A digital value is then stored for each of those pixels. The digital values can be read out of the storage and converted into an image in an appropriate player device.

The digital storage of the image or video data also allows various video processing functions to be performed. That is, the digital values can be manipulated, in order to alter the appearance of the image when the signal is supplied to the player device.

It is recognized that video processing functionality can advantageously be provided on a Programmable Logic Device (PLO) such as a Field Programmable Gate Array (FPGA), because such devices can efficiently provide the required processing resources.

One of the issues raised by digital image or video processing relates to the large amount of data storage capacity that is required. For example, FPGA devices typically do not include large amounts of memory, and so it is often necessary to store the data in a separate device, retrieve the data to the FPGA device for processing, and then store the data again in the separate device.

Many video processing functions produce an output value for each pixel by calculating a function of the original pixel values for that pixel and for one or more adjacent or surrounding pixels. In order to be able to perform such functions, it is necessary for the video processing device to store temporarily the data relating to the calculations that it is performing at that time, because it is not practical to retrieve the data from an external device within the required timescale. For example, where the video processing function involves calculating a new value for a pixel, based on original values for that pixel, and for pixels in the lines above and below that pixel, then the video processing device may store the original data values for two lines of pixels in a line buffer. This allows the data to be retrieved from the external memory device sequentially, and such sequential accesses can be performed more efficiently than non-sequential accesses, which is a requirement if high data rates are to be achieved.

However, although this reduces the amount of data storage required on the video processing device, it still places a significant burden on the available memory resources on some video processing devices, particularly when the video processing device is required to handle high definition television signals, with large numbers of pixels in each line and/or large numbers of data bits for each pixel.

SUMMARY OF THE INVENTION

According to one aspect of the invention, the video processing device does not process, the pixels in the conventional order, i.e. processing one complete row of pixels, then moving on to the next row to process that complete row, and so on.

Rather, the data is processed in columns. That is, the pixel array is divided into columns, and the video processing device first processes one row of pixels within a first column, then moves on to the next row within that column, and so on until that column is completely processed, and then moves on to the next column, to process the rows of pixels in that column, and so on.

According to one aspect of the invention, there is provided a method of processing data. According to another aspect of the invention, there is provided a data processing device.

DETAILED DESCRIPTION OF EMBODIMENTS

Figure 1:
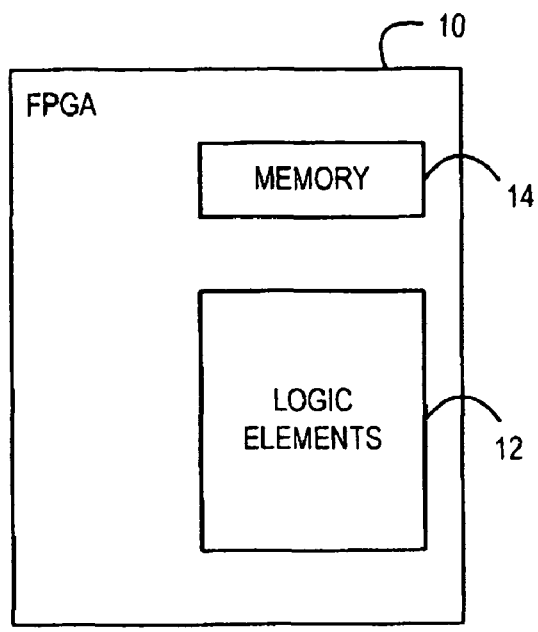
FIG. 1 is a block schematic diagram of a programmable logic device in accordance with an aspect of the invention.

FIG. 1 illustrates a programmable logic device (PLD), in the form of a Field Programmable Gate Array (FPGA) 10. As is conventional, the FPGA 10 includes logic elements 12, and a memory 14. The interconnections between the logic elements, and between the logic elements and the memory 14, are determined by configuration data, which can be applied to the FPGA 10 from a configuration memory (not shown). By changing the configuration data, the interconnections can be changed, and hence the functionality of the device can be changed.

In aspects of the present invention, the configuration data applied to the FPGA 10 causes it to function as a video processing device, although it will be understood that the same principles can be applied to other data processing devices. Specifically, as the invention relates to the processing of frames of video data, it will be immediately apparent that the same methods could be applied to processing individual images, and the term "video data" is used herein to mean data relating to frames of motion pictures, or television programs, or the like, or data relating to individual images.

Figure 2:
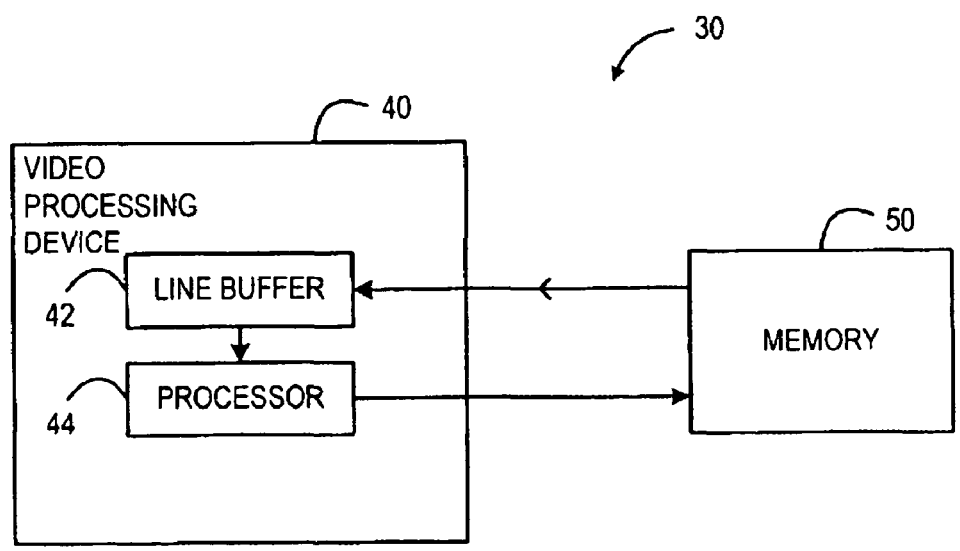
FIG. 2 is a block schematic diagram of a video processing system in accordance with an aspect of the invention.

FIG. 2 is a schematic diagram, illustrating the form of the video processing system 30, including the video processing device 40 according to an aspect of the invention, including the functional blocks that are produced in the FPGA 10 by the configuration data.

Specifically, the video processing device 40 includes a line buffer 42, for temporarily storing data, as described in more detail below, and a processor 44, for performing one or more video processing function.

The video processing-system 30 also includes a memory 50, for storing the video data.

Figure 3:
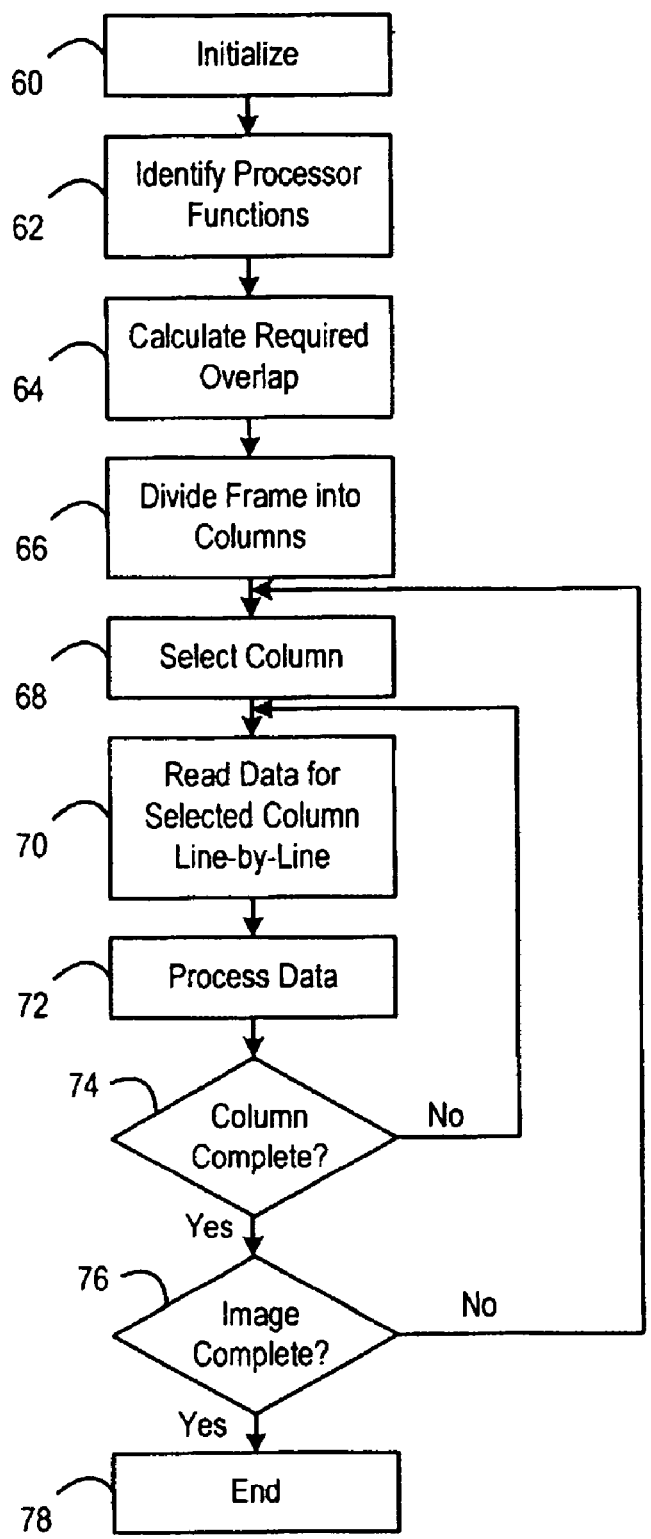
FIG. 3 is a flow chart, illustrating a method in accordance with an aspect of the invention.

FIG. 3 is a flow chart, illustrating a method in accordance with an aspect of the invention.

In step 60, the process is initialized and, in step 62, the required processor function or functions are identified. As is well known, a large number of image or video processing functions are available, the invention being particularly applicable to video processing functions in which an output pixel value is obtained from a plurality of input pixel values, for example the pixel values for the particular pixel under consideration plus one or more adjacent or surrounding pixels.

Examples of such functions include Finite Impulse Response filters (FIRs), median filters, scalers, and motion estimators.

Any such function, or combination of functions, can be used in the method according to the invention. Initially, the invention will be described for the purposes of illustration in connection with a single processing function where each output pixel value is generated as a function of a group of input pixel values surrounding the corresponding input pixel.

Figure 4:
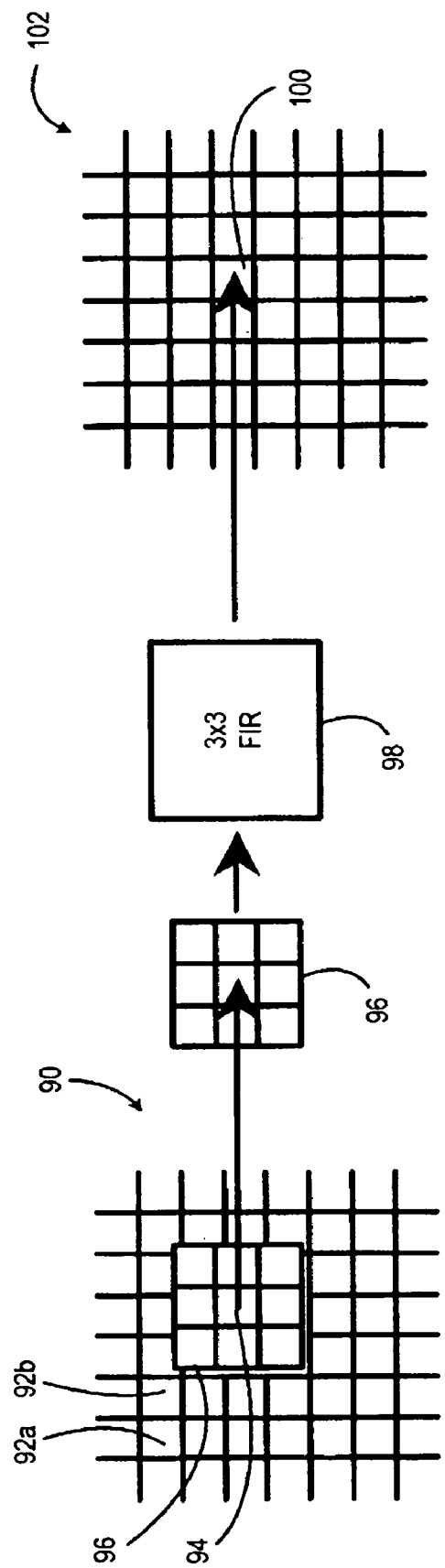
FIG. 4 illustrates a step in the method of FIG. 3.

FIG. 4 illustrates the operation of such a function. Specifically, FIG. 4 shows an array 90, made up of individual pixels 92a, 92b, arranged in horizontal rows and vertical columns. Before the processing function is performed, each of the pixels has an input pixel value associated with it. As is well known, the pixel value may be single numerical value, in the case of a monochrome image, or may be a combination of luminance (brightness) and chrominance (representing colour) values in the case of a colour image, or may take any other form.

In order to perform the processing function, each of the pixels is considered in turn. In order to obtain the output value for the pixel 94, for example, the processing function uses the input pixel values for the pixels in the block 96. That is, in this case, where the function uses a 3×3 filter centered on the relevant pixel, the processing function uses the input pixel values for the pixel 94 and for the eight immediately surrounding pixels.

In this illustrated case, for example only, a 3×3 FIR filter 98 is applied. That is, for each pixel within the FIR filter 98, there exists a respective coefficient, and the processing is performed by multiplying the pixel values for the pixels within the block 98 by the corresponding coefficients in the FIR filter 98, and adding together the nine results of those multiplications.

The resulting output pixel value 100 then forms part of the processed image 102.

The present invention relies on dividing the frame, in order to perform the required processing function. More specifically, in this illustrated embodiment, the frame is divided into columns, each comprising a respective subset of the columns making up the image array 90, and the columns are processed in sequence.

Figure 5:
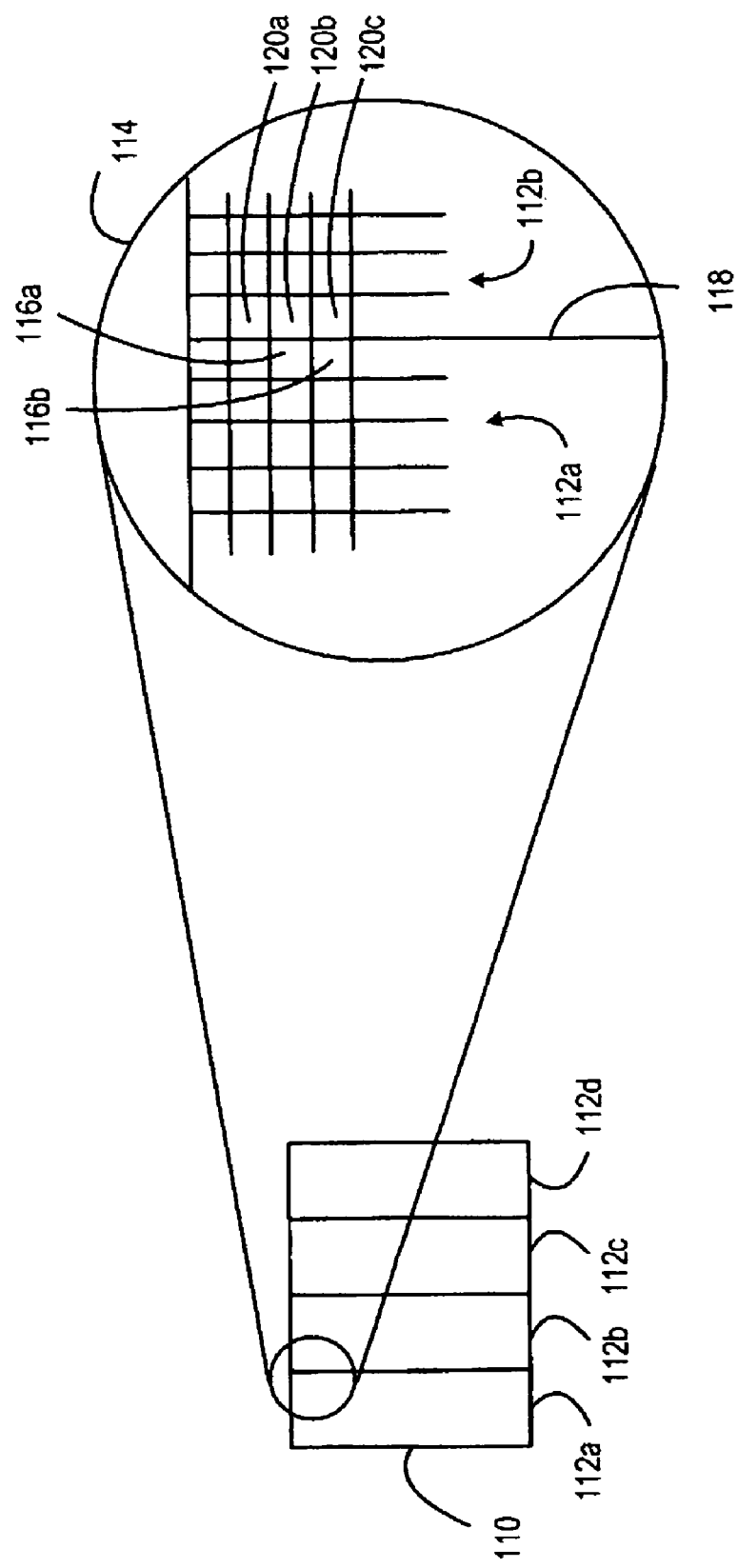
FIG. 5 illustrates a second step in the method of FIG. 3.

FIG. 5 illustrates the division of the frame into columns. Specifically, the frame 110 is divided into four columns 112a, 112b, 112c, 112d in this example. The enlargement 114 shows more clearly the pixels 116a, 116b etc in the first column 112a, close to the boundary 118 between the first column 112a and the second column 112b.

From the discussion of FIG. 4 above, it will be appreciated that, when forming the output pixel value for one these pixels close to the boundary 118, it is necessary to use input pixel values for pixels on the other side of the boundary 118. For example, when applying a 3×3 filter to form the output pixel value for the pixel 116a, it is necessary to use input pixel values for pixels 120a, 120b, 120c on the other side of the boundary 118, as well as various pixels on the same side of the boundary.

Therefore, in step 64, the required processing function is analysed, or the required processing functions are analysed, to determine the size of the overlap that is required to allow the processing to be performed. Thus, in this illustrated case, the filter uses the first pixels in the adjacent column, in order to process fully the pixels within a particular column. There is therefore a required overlap of two pixels at each boundary, such as the boundary 118. That is, the first column 112a must also include one pixel from the right hand side of the boundary 118 to allow the pixels inside that boundary to be processed, while the second column 112b must also include one pixel from the left hand side of the boundary 118.

More generally, the function is analysed to determine how far (in terms of numbers of pixels) the column must be extended so that it contains enough pixels to allow every pixel within the column to be processed. The size of the overlap at each boundary includes the pixels from the right hand side of the boundary that must be read out with the pixels from the left hand side of the boundary to allow the column to the left of the boundary to be processed correctly, and also includes the pixels from the left hand side of the boundary that must be read out with the pixels from the right hand side of the boundary to allow the column to the right of the boundary to be processed correctly.

If the kernel is symmetrical, that is, it extends the same number of pixels to the right as to the left of the pixel of interest, then the size of the overlap at each boundary is twice this number of pixels.

In step 66, the frame is divided into columns. As will be discussed in more detail below, increasing the number of columns (and hence reducing the width of the columns) reduces the amount of memory that is required within the processing device, but has a penalty in terms of efficient accesses to the external memory. These two factors can therefore be traded against each other to determine the required number of columns. For example, in a typical video processing system, the appropriate number of columns may be in the region of 4 to 10.

In step 68, one of the columns is selected. The columns are preferably processed in a left to right order, and so the first column to be selected is the leftmost column.

Figure 6:
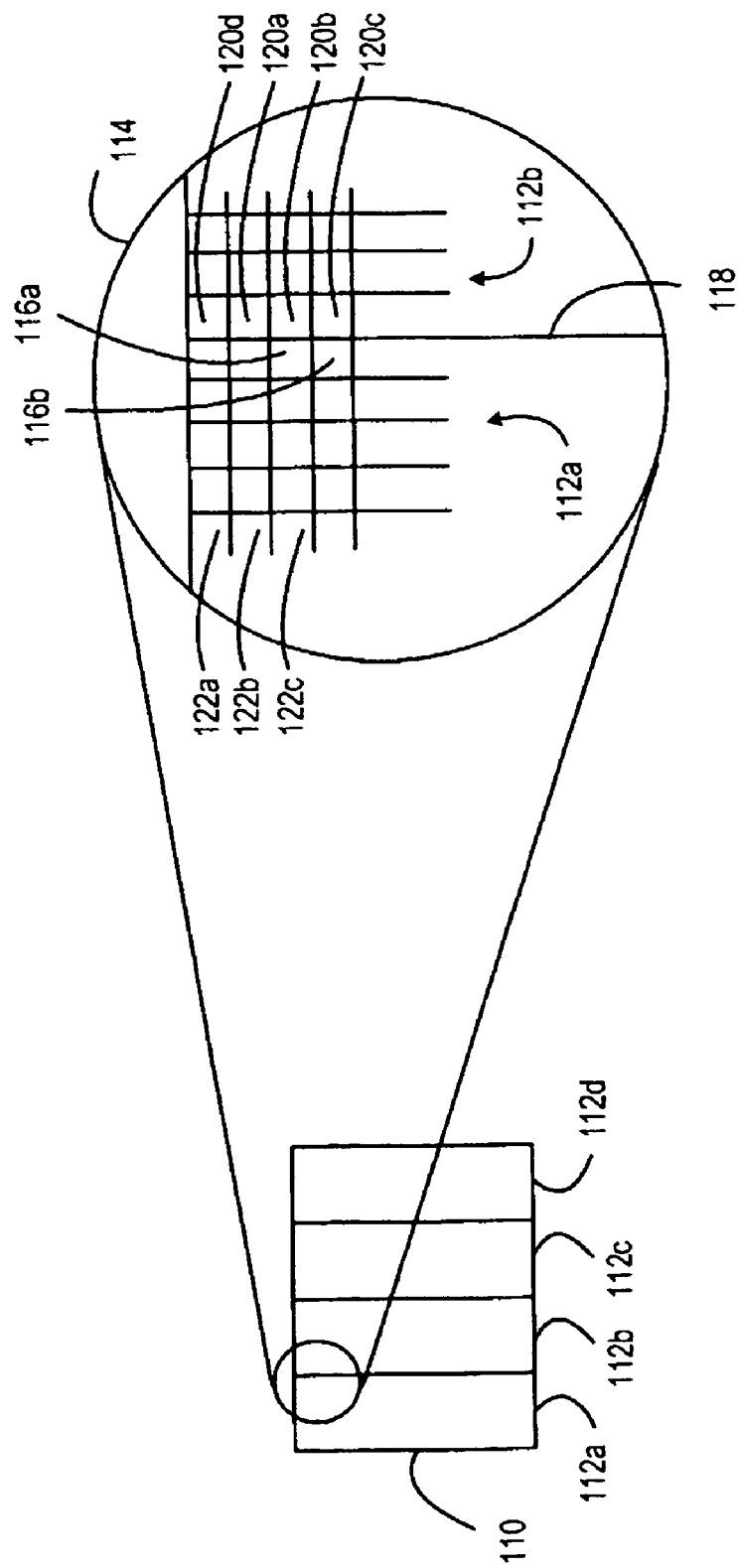
FIG. 6 illustrates a third step in the method of FIG. 3.

In step 70, data begins to be read. Specifically, data is read line-by-line for the selected column. FIG. 6 illustrates this step in the process. Specifically, considering the processing relating to the leftmost column 112a, the pixel values for the first row 122a of pixels as far as and including the pixel 120d (that is, the first pixel to the right of the boundary 118, provided as the overlap discussed above) are read out of the external memory 50. Then, the pixel values for the second row 122b of pixels as far as and including the pixel 120a are read out of the external memory 50. Then, the pixel values for the third row 122c of pixels as far as and including the pixel 120b are read out of the external memory 50.

Data can most efficiently be read out of the external memory 50 sequentially. That is, when data is read from a memory address, the memory address that can most efficiently be read next is the data from the next memory address. Thus, in this case, most of the memory accesses are sequential, but a non-sequential access is performed when the rightmost pixel in each column (including the relevant overlap) is reached.

Data values that are read out of the external memory 50 are stored in the line buffer 42 in the video processing device 40. Thus, storing pixel values for partial rows of pixels reduces the storage requirements in the line buffer 42, compared with an alternative in which complete pixel values for complete rows must be stored.

Figure 7:
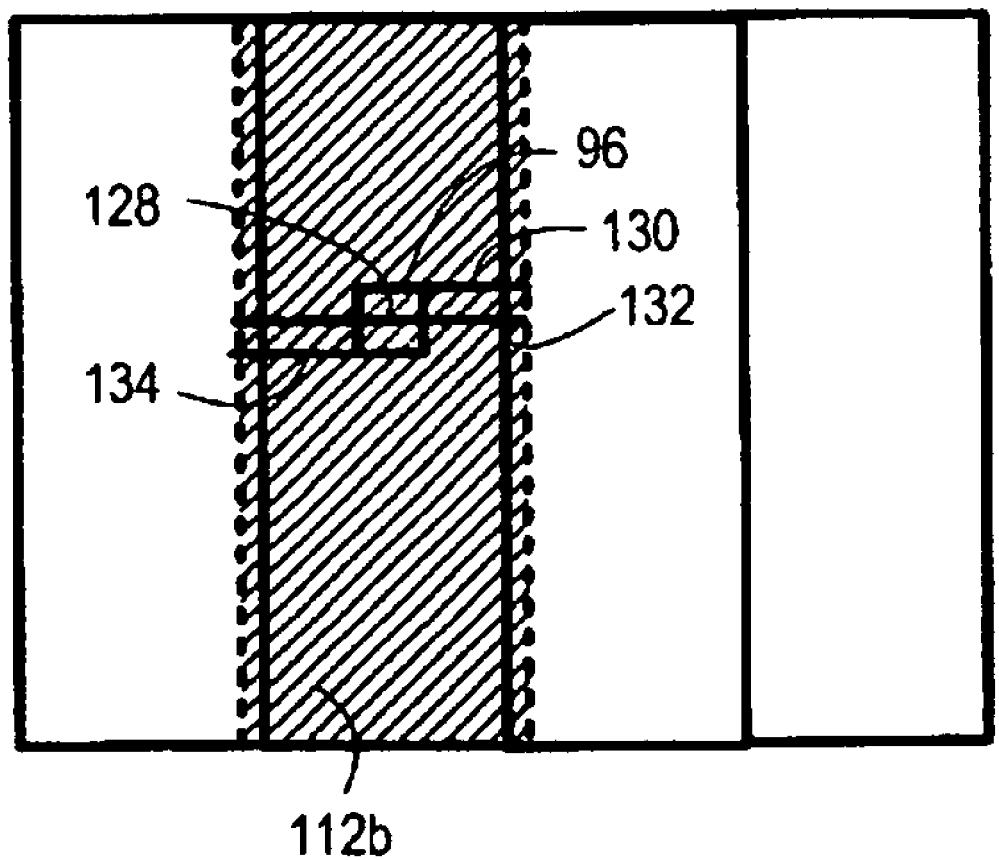
FIG. 7 illustrates a fourth step in the method of FIG. 3.

When enough data has been stored in the line buffer 42, the procedure can pass to step 72, and the processing of the data can begin. The amount of data that needs to be stored depends on the size of the processing kernel. FIG. 7 illustrates this. Specifically, FIG. 7 illustrates the situation where the second column 112b is being processed, using the 3×3 kernel 96. In order to calculate the output pixel value for the central pixel 128 of the kernel 96, it is necessary for the processor 44 to be able to access three pixel value for the preceding line 130, three pixel values for the line 132 containing the central pixel 128, and three pixel values for the succeeding line 134. As soon as all of these data values have been read into the line buffer 42 the processor 44 is able to calculate the output pixel value for the central pixel 128 of the kernel 96. Thus, the line buffer is storing pixel values for two complete lines of pixels, plus three additional pixels.

As soon as this required amount of data has been read into the line buffer 42, the processor 44 is able to calculate a pixel value for one pixel. Thereafter, when each new pixel is read, a new pixel value can be calculated, and an old pixel value can be discarded from the line buffer 42. The output pixel values, calculated for each pixel, are then read back into the external memory 50.

The output values can be stored sequentially in memory addresses, corresponding to the order in which they are calculated. However, as they may ultimately be required to be read out of a memory in raster order (that is, with each complete row read out from left to right, and with the rows read out from top to bottom of the frame), steps may instead be taken to store them so that they can be read out in raster order from sequential memory addresses.

The video processing step can then be performed for each pixel within a line and, when each line is complete, it can be determined in step 74 whether the entire column has been processed. If the column has not been fully processed, the procedure returns to step 70, in which the data for the column continues to be read out and processed.

If it is determined in step 74 that a column has been fully processed, the procedure passes to step 76, in which it is determined whether the image is completely processed. If it is determined in step 76 that one or more columns remains, the procedure returns to step 68, in which the next column is selected. If it is determined in step 76 that no more columns remain, the procedure passes to step 78, and ends.

There are thus described a method, and a device, for performing a video processing function.

As mentioned above, it can be required to perform two or more video processing functions sequentially, and the method and the device according to the present invention can be used in such a case.

Figure 8:
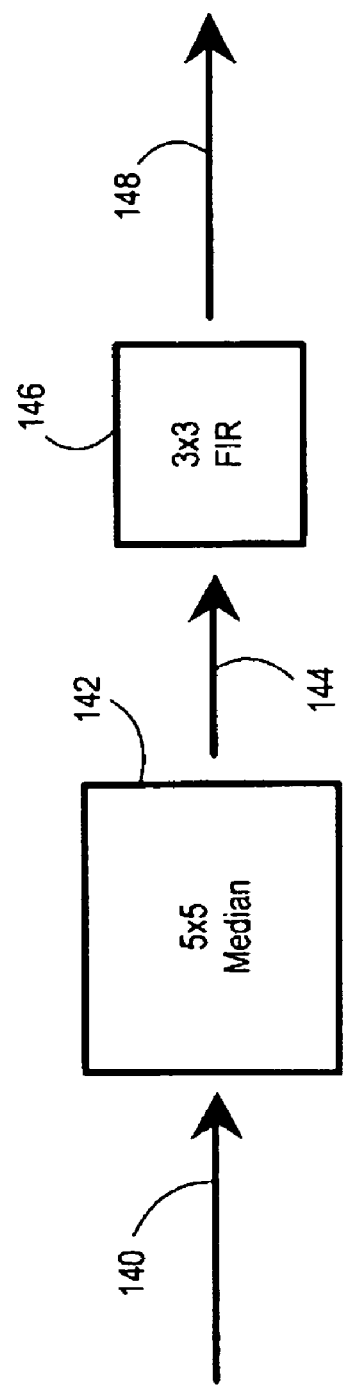
FIG. 8 is a schematic diagram, illustrating a further video processing system in accordance with an aspect of the invention.

FIG. 8 illustrates such a process. Specifically, input data 140 can be read out of an external memory, and stored in a line buffer, before being subject to a first process 142, in this case a Median filter acting on a 5×5 kernel centered on the pixel of interest.

The resulting intermediate data 144 is stored back into the line buffer, before being subject to a second process 146, in this case a FIR filter acting on a 3×3 kernel centered on the pixel of interest. The resulting output data 148 can be read back to the external memory.

It will be apparent from the discussion above that, for the second process 146 to be able to produce output data for each pixel within a column, it also needs to have access to intermediate data for an overlap region of one pixel to each side of the column. It will also be apparent that, for the first process 142 to be able to produce intermediate data for each pixel within a column, it also needs to have access to intermediate data for an overlap region of two pixels to each side of the column, and therefore that, for the first process 142 to be able to produce intermediate data for each pixel within a column and within an overlap region of one pixel to each side of the column, it also needs to have access to intermediate data for an overlap region of three pixels to each side of the column.

Thus, in this case, the required overlap width is determined by adding together the overlap widths that would have been required by the two processes 142, 146 separately.

By storing the intermediate data 144 in the line buffer on the processing device, the required external memory accesses can be reduced, and so there is described a process that allows sequential image processing functions to be performed in an efficient manner.

The invention claimed is:

1. A method of processing data in a data processing device, wherein the data comprises data relating to each of a plurality of locations in a spatial array formed of rows and columns, and wherein the data processing device includes a processor and a buffer memory, the method comprising:

the data processing device identifying a plurality of groups of columns to be used in processing the data, wherein a respective subset of columns is associated with each column group, wherein the number of columns in a subset includes the columns of the corresponding column group and a portion of the columns in neighboring column groups;

the data processing device reading data relating to a plurality of rows of a first subset of said columns from a separate memory device, and storing said data relating to the first subset of said columns sequentially in said buffer memory, the first subset corresponding to a first column group; and the data processing device processing said data relating to the first subset of said columns to obtain output data corresponding to the plurality of locations in the first column group; and, subsequently:

the data processing device reading data relating to a second subset of said columns from said separate memory device, and storing said data relating to the second subset of said columns sequentially in said buffer memory, the second subset corresponding to a second column group; and the data processing device processing said data relating to the second subset of said columns to obtain output data corresponding to the plurality of locations in the second column group.

2. A method as claimed in claim 1, wherein said second subset of columns partially overlaps said first subset of columns.

3. A method as claimed in claim 1, wherein said processing comprises applying a kernel to said data, such that output data for each location in the spatial array is a function of input data for said location and of input data for at least one location adjacent said location.

4. A method as claimed in claim 3, wherein:

said kernel is such that output data for each location in the spatial array is a function of input data for said location and of input data for each other location within a predetermined number of locations from said location; and said second subset of columns partially overlaps said first subset of columns by twice said predetermined number of locations.

5. A method of processing data in a data processing device, wherein the data comprises data relating to each of a plurality of locations in a spatial array formed of rows and columns, and wherein the data processing device includes a processor and a buffer memory, the method comprising:

the data processing device reading data relating to a first subset of said columns from a separate memory device, and storing said data relating to the first subset of said columns in said buffer memory; and the data processing device processing said data relating to the first subset of said columns; and, subsequently:

the data processing device reading data relating to a second subset of said columns from said separate memory device, and storing said data relating to the second subset of said columns in said buffer memory; and processing said data relating to the second subset of said columns, wherein said processing comprises:

applying a first kernel to said data, such that interim output data for each location in the spatial array is a function of input data for said location and of input data for each other location within a first predetermined number of locations from said location; and applying a second kernel to said data, such that output data for each location in the spatial array is a function of interim output data for said location and of interim output data for each other location within a second predetermined number of locations from said location, wherein said second subset of columns partially overlaps said first subset of columns by a number of columns which is twice a sum of said first predetermined number and said second predetermined number.

6. A method of processing video data in a data processing device, wherein the video data comprises data relating to each of a plurality of pixels in an image array formed of rows and columns, and wherein the data processing device includes a processor and a buffer memory, the method comprising;

the data processing device identifying a plurality of groups of columns to be used in processing the video data, wherein a respective subset of columns is associated with each column group, wherein the number of columns in a subset includes the columns of the corresponding column group and a portion of the columns in neighboring column groups;

the data processing device reading image data relating to a plurality of rows of a first subset of said columns from a separate memory device, and storing said image data relating to the first subset of said columns in said buffer memory, the first subset corresponding to a first column group;

the data processing device processing said image data relating to the first subset of said columns to obtain output data corresponding to the pixels in the first column group;

the data processing device storing the output data corresponding to the pixels in the first column group in said buffer memory; and the data processing device processing the output data corresponding to the pixels in the first column group to obtain other output data corresponding to the pixels in the first column group; and, subsequently:

reading image data relating to a second subset of said columns from said separate memory device, and storing said image data relating to the second subset of said columns in said buffer memory, the second subset corresponding to a second column group; and processing said image data relating to the second subset of said columns to obtain output data corresponding to the pixels in the second column group.

7. A method of processing data in a data processing device, wherein the data comprises data relating to each of a plurality of locations in a spatial array formed of rows and columns, and wherein the data processing device includes a processor and a buffer memory, the method comprising:

the data processing device reading data relating to a plurality of rows of a first subset of said columns, and data relating to at least one first overlap column immediately adjacent said first subset of columns, from a separate memory device;

the data processing device storing said data relating to the first subset of said columns and said data relating to the at least one first overlap column sequentially in said buffer memory; and the data processing device processing said data relating to the first subset of said columns using said data relating to the at least one first overlap column to obtain output data corresponding to the plurality of locations in the first subset of columns; and, subsequently:

the data processing device reading data relating to a second subset of said columns, and data relating to at least one second overlap column immediately adjacent said second subset of columns, from said separate memory device;

the data processing device storing said data relating to the second subset of said columns and said data relating to said at least one second overlap column sequentially in said buffer memory; and the data processing device processing said data relating to the second subset of said columns using said data relating to the at least one second overlap column to obtain output data corresponding to the plurality of locations in the second subset of columns.

8. A video processing device, comprising a processor and a buffer memory, and having a connection for an external memory device, wherein the processing device processes video data relating to each of pixels in a frame of an image, the frame being formed of rows and columns of pixels, wherein a plurality of groups of columns are used in processing the video data, wherein a respective subset of columns is associated with each column group, wherein the number of columns in a subset includes the columns of the corresponding column group and a portion of the columns in neighboring column groups;

wherein data relating to a first subset of said columns is read from said external memory device, and stored sequentially in said buffer memory, the first subset corresponding to a first column group, and said processor processes said data relating to the first subset of said columns to obtain output data corresponding to the pixels in the first column group; and, subsequently:

wherein data relating to a second subset of said columns is read from said external memory device, and stored sequentially in said buffer memory, the second subset corresponding to a second column group; and said processor processes said data relating to the second subset of said columns to obtain output data corresponding to the pixels in the second column group.

9. A method as claimed in claim 1, wherein all the data of the first column group is processed before any of the data of a second column group.

10. A method as claimed in claim 1, further comprising:

the data processing device storing the output data corresponding to the plurality of locations in the first column group in said buffer memory; and the data processing device processing the output data corresponding to the plurality of locations in the first column group to obtain other output data corresponding to the plurality of locations in the first column group.

* * * * *